US008421574B2

United States Patent
Suzuki et al.

(10) Patent No.: US 8,421,574 B2
(45) Date of Patent: Apr. 16, 2013

(54) CONTACTLESS POWER TRANSMISSION APPARATUS AND A METHOD OF MANUFACTURING A SECONDARY SIDE THEREOF

(75) Inventors: Masayuki Suzuki, Otsu (JP); Hiroyasu Kitamura, Hirakata (JP); Satoru Inakagata, Nara (JP); Atsushi Isaka, Hikone (JP); Tatsuhiko Keishu, Hikone (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/665,025

(22) PCT Filed: Jun. 12, 2008

(86) PCT No.: PCT/JP2008/060779
§ 371 (c)(1),
(2), (4) Date: Dec. 16, 2009

(87) PCT Pub. No.: WO2008/156025
PCT Pub. Date: Dec. 24, 2008

(65) Prior Publication Data
US 2010/0181842 A1    Jul. 22, 2010

(30) Foreign Application Priority Data

Jun. 20, 2007 (JP) ................................ 2007-163051
Jun. 20, 2007 (JP) ................................ 2007-163058

(51) Int. Cl.
*H01F 5/00* (2006.01)
*H01F 27/28* (2006.01)
*H01F 27/24* (2006.01)

(52) U.S. Cl.
USPC ........................... 336/200; 336/232; 336/233

(58) Field of Classification Search .................. 336/200, 336/232, 233
See application file for complete search history.

(56) References Cited

U.S. PATENT DOCUMENTS 3,594,672 A * 7/1971 Frenkel ......................... 336/132
3,676,814 A * 7/1972 Trunzo et al. ................. 336/205
(Continued)

FOREIGN PATENT DOCUMENTS

JP     62-36512 U      3/1987
JP     3-232207 A     10/1991
(Continued)

OTHER PUBLICATIONS

International Search Report for the Application No. PCT/JP2008/060779 mailed Jul. 15, 2008.
(Continued)

*Primary Examiner* — Mohamad Musleh
*Assistant Examiner* — Tsz Chan
(74) *Attorney, Agent, or Firm* — McDermott Will & Emery LLP

(57) ABSTRACT

According to a first aspect, a secondary side of contactless power transmission apparatus includes: a holding member which is physically separated from a primary side; a magnetic layer; a shield layer for shielding electromagnetic noise; and a heat insulation layer. The secondary coil is a planar coil and supported by the holding member, and at least the magnetic layer is laminated on one side of the planar coil and unified with the planar coil. According to a second aspect, the secondary side of the apparatus includes a plurality of magnetic layers. Each permeability of the magnetic layers is different from each other, and each of the magnetic layers forms a magnetic path with the primary side.

20 Claims, 12 Drawing Sheets

U.S. PATENT DOCUMENTS

| | | | | |
|---|---|---|---|---|
| 4,496,896 A | * | 1/1985 | Melocik et al. | 320/108 |
| 4,543,553 A | * | 9/1985 | Mandai et al. | 336/83 |
| 5,062,197 A | * | 11/1991 | Charles | 29/606 |
| 5,198,647 A | | 3/1993 | Mizuta | |
| 5,430,424 A | * | 7/1995 | Sato et al. | 336/200 |
| 5,500,632 A | * | 3/1996 | Halser, III | 336/180 |
| 6,008,622 A | * | 12/1999 | Nakawatase | 320/108 |
| 6,265,789 B1 | * | 7/2001 | Honda et al. | 307/33 |
| 6,603,382 B1 | * | 8/2003 | Komai et al. | 336/200 |
| 7,042,325 B2 | * | 5/2006 | Giandalia et al. | 336/200 |
| 2003/0020583 A1 | * | 1/2003 | Hui et al. | 336/200 |
| 2005/0007296 A1 | * | 1/2005 | Endo et al. | 343/895 |
| 2006/0266435 A1 | * | 11/2006 | Yang et al. | 148/105 |
| 2007/0001921 A1 | * | 1/2007 | Takahashi et al. | 343/788 |
| 2007/0030659 A1 | * | 2/2007 | Suzuki et al. | 361/793 |
| 2007/0090790 A1 | * | 4/2007 | Hui | 320/108 |
| 2007/0103952 A1 | * | 5/2007 | Sakai et al. | 363/171 |

FOREIGN PATENT DOCUMENTS

| | | | |
|---|---|---|---|
| JP | 8-79976 A | | 3/1996 |
| JP | 2000-90221 A | | 3/2000 |
| JP | 2000-252143 A | | 9/2000 |
| JP | 2000269059 A | * | 9/2000 |
| JP | 2000-340440 A | | 12/2000 |
| JP | 2003-68544 A | | 3/2003 |
| JP | 2003-173921 A | | 6/2003 |
| JP | 2003-244855 A | | 8/2003 |
| JP | 2003-272938 A | | 9/2003 |
| JP | 2004-47701 A | | 2/2004 |
| JP | 2006-311712 A | | 11/2006 |
| JP | 2006-314181 A | | 11/2006 |
| JP | 2006-353094 A | | 12/2006 |

OTHER PUBLICATIONS

Notification of Reasons for Refusal for Application No. 2007-163058 from Japan Patent Office mailed Mar. 29, 2011.

* cited by examiner

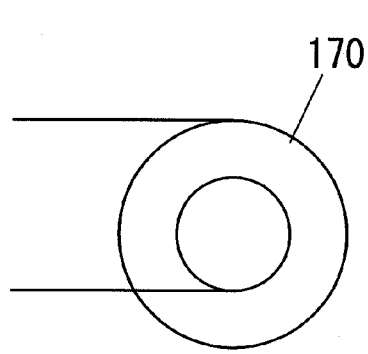
FIG. 4A
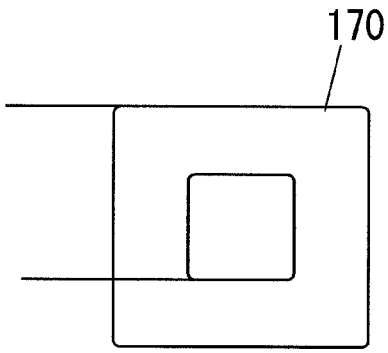
FIG. 4B
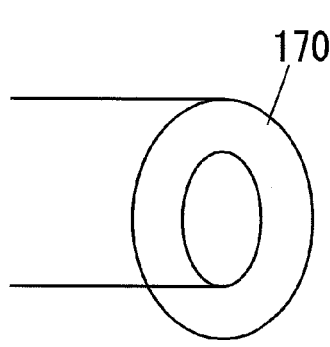
FIG. 4C
FIG. 5
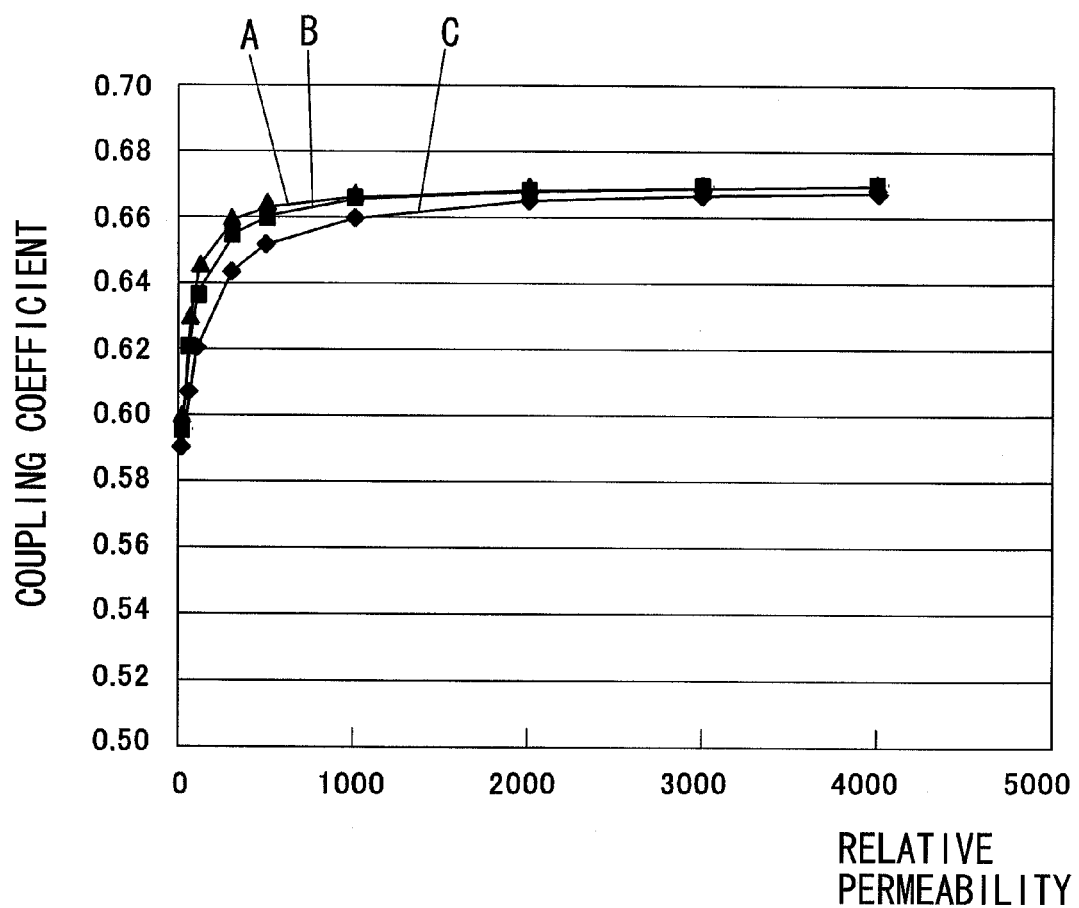

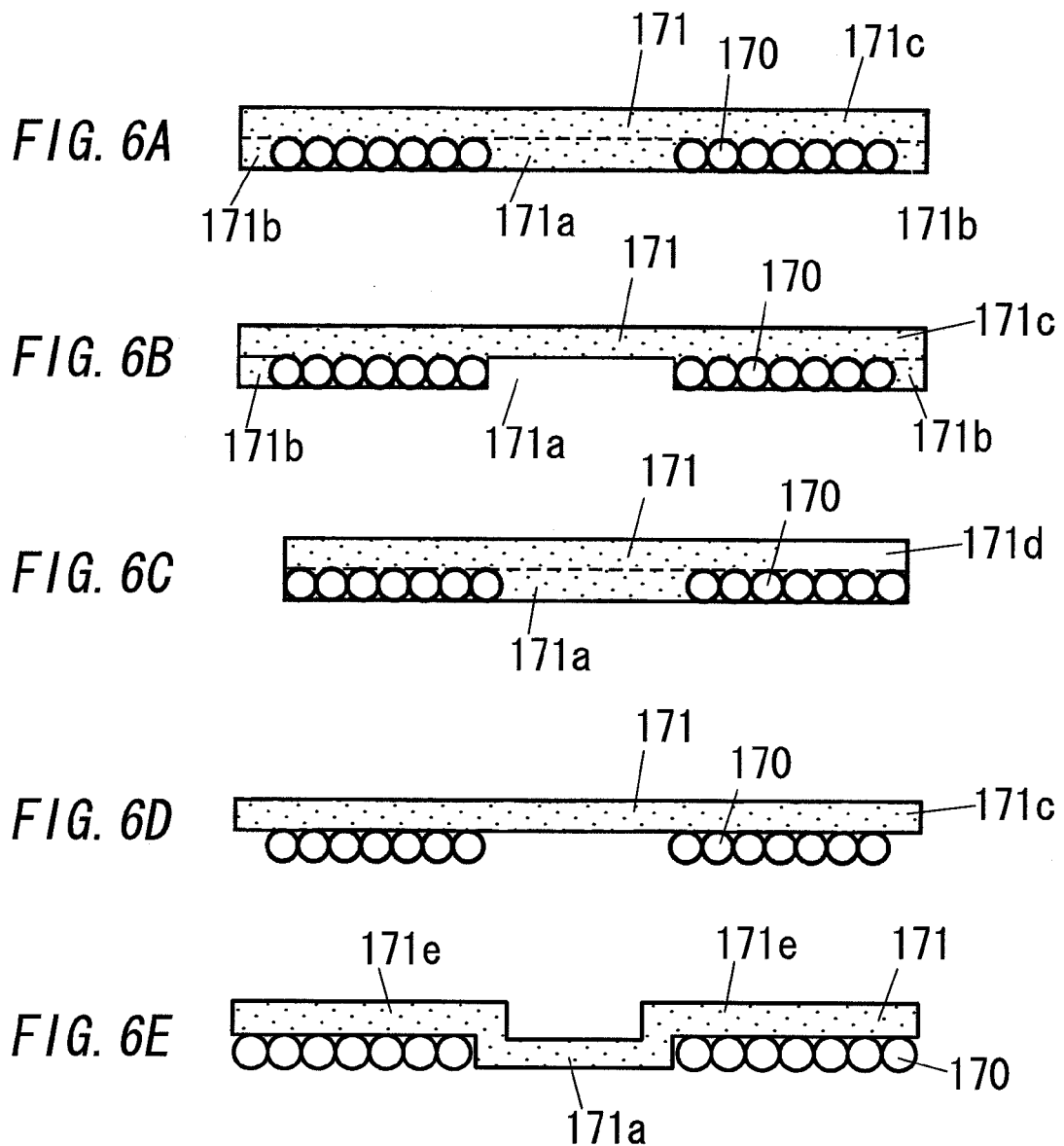

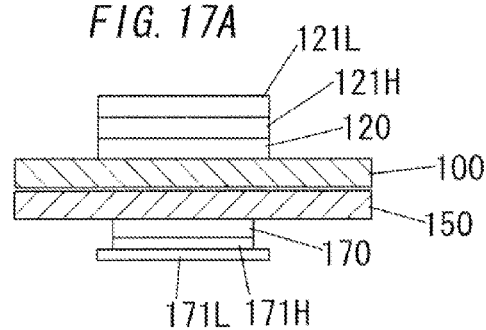
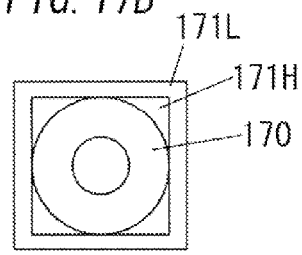
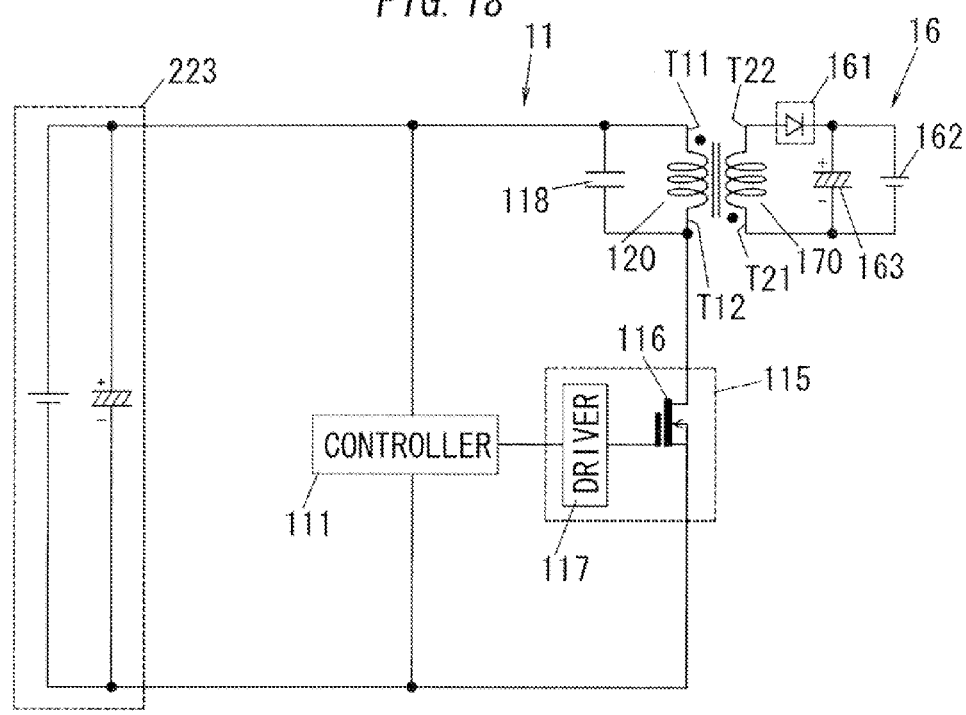

CONTACTLESS POWER TRANSMISSION APPARATUS AND A METHOD OF MANUFACTURING A SECONDARY SIDE THEREOF

TECHNICAL FIELD

The invention relates to contactless power transmission apparatus capable of transmitting electric power without any direct electric connection, and a method of manufacturing a secondary side of the apparatus.

BACKGROUND ART

That kind of contactless power transmission apparatus is broadly divided into a power transmitter in a primary side and a power receiver in a secondary side. The power transmitter includes a primary coil and is used for a device such as a charger or the like (hereinafter referred to as a "primary device"). The power receiver includes a secondary coil and is used for a device such as a cordless phone, a shaver, an electric toothbrush, a personal digital assistance or the like (hereinafter referred to as a "secondary device"). The primary and secondary coils constitute a transformer, and electric power is transmitted from the primary side to the secondary side by electromagnetic induction between the coils. Thus, the contactless power transmission apparatus does not have any electric contact for transmitting power from the primary side to the secondary side. Accordingly, the issue of contact degradation is not raised, and it is possible to easily pair the primary and secondary devices to transmit power from the primary side to the secondary side. In addition, each waterproof structure of the primary and secondary devices can be easily realized.

Each of the power transmitter and the power receiver further has a core or a bobbin (molding) in general, and each coil of them is wound around its core or bobbin.

In recent years, such a secondary device has been especially required to be miniaturized, thinned and provided with high performance. In order to comply with the requirement, the secondary coil needs to be thinned. Because of this, a planar coil has been proposed for the secondary coil (e.g., Japanese Patent Application Publication Number 2006-311712 published on Nov. 9, 2006). However, the planar coil is inferior in magnetic properties to the coil wound around a core, and accordingly power in the secondary side is reduced. If a magnetic layer is added to the planar coil, the power transmission efficiency between the primary and secondary sides can be enhanced, but a thin magnetic layer must be formed, which becomes a problem.

Also in order to miniaturize the secondary device, some parts in the secondary device are arranged to approach the planar coil and the distance among them is shortened. Accordingly, if the parts include a weak part in heat and noise, e.g., a lithium ion secondary battery or the like, the weak part is put under the influence of heat and noise, increased by proximity to the planar coil.

DISCLOSURE OF THE INVENTION

It is an object of the present invention to enhance the power transmission efficiency between primary and secondary sides and also to reduce the influence of noise from a planar coil. It is another object of the present invention to reduce the influence of heat and noise from the planar coil.

In a first aspect of the present invention, contactless power transmission apparatus comprises a secondary coil located in a secondary side, and is configured to transmit electric power from a primary side to the secondary side by electromagnetic induction between a primary coil and the secondary coil (hereinafter referred to as a "first configuration"). The primary coil is located in the primary side. The secondary side further comprises: a holding member which is physically separated from the primary side; a magnetic layer; a shield layer for shielding electromagnetic noise; and a heat insulation layer. The secondary coil is a planar coil and supported by the holding member. At least the magnetic layer is laminated on one side of the planar coil and unified with the planar coil. In the structure, since the magnetic layer is laminated to the planar coil, the power transmission efficiency between the primary and secondary sides can be enhanced. Since the secondary side includes the shield layer, the influence of noise from the planar coil can be reduced. Since the secondary side includes the heat insulation layer, the influence of heat and noise from the planar coil can be reduced.

Preferably, the contactless power transmission apparatus further comprises a radiation layer located between the holding member and the planar coil.

In an embodiment, the magnetic layer is formed to spread over a spiral depression on said one side of the planar coil. In the structure, magnetic flux density and the power transmission efficiency can be enhanced.

Preferably, the magnetic layer is laminated on said one side of the planar coil; the shield layer is laminated on the magnetic layer; and the heat insulation layer is laminated on the shield layer (hereinafter referred to as a "second configuration").

Preferably, the contactless power transmission apparatus further comprises a secondary device which includes the secondary side and has a housing. The holding member is a part of the housing.

Preferably, the contactless power transmission apparatus further comprises a functional member located in the secondary side. The holding member is the functional member.

In an embodiment, the contactless power transmission apparatus further comprises a secondary device including the secondary side and the holding member. The combination of the planar coil and at least the magnetic layer is in the form of a card, and can be attached to and detached from the holding member. Or the combination of the planar coil, the magnetic layer, the shield layer and the heat insulation layer is in the form of a card, and can be attached to and detached from the holding member. In these constructions, the simplicity of treatment can be improved.

A method of manufacturing the second side in the first configuration comprises forming the magnetic layer by pressing magnetic material made of crystalline metal material or non-crystalline metal material. In the method, magnetic flux density can be improved.

A method of manufacturing the second side in the second configuration comprises: applying the heat insulation layer to one side of the shield layer; fixing the heat insulation layer and the shield layer by drying; sticking the other side of the shield layer and one side of the magnetic layer together; and sticking the other side of the magnetic layer and said one side of the planar coil together. In the method, the secondary side can be easily manufactured.

In a second aspect of the present invention, contactless power transmission apparatus comprises a primary coil located in a primary side and a secondary coil located in a secondary side, and is configured to transmit electric power from the primary side to the secondary side by electromagnetic induction between the primary and the secondary coils. The primary side further comprises a first holding member which supports the first coil. The secondary side further comprises: a second holding member which is physically separated from the first holding member and supports the secondary coil; and a plurality of magnetic layers. The secondary coil is a planar coil. Each permeability of the magnetic layers is different from each other, and each of the magnetic layers forms a magnetic path with the primary side. In the structure, the secondary side includes a magnetic layer having high permeability and a magnetic layer having low permeability. The magnetic layer having high permeability increases the coupling between the primary and secondary coils. The magnetic layer having low permeability enhances the transmission efficiency of high frequency components from the primary side to the secondary side, and suppresses noise. The high frequency components include higher frequencies than high switching frequency of power transmission.

In the second aspect, preferably, the primary side further comprises a plurality of magnetic layers. The primary coil is a planar coil. Each permeability of the magnetic layers in the primary side is different from each other, and each of the magnetic layers in the primary side forms a magnetic path with the secondary side. In the structure, noise to the primary side and noise from the primary side to the secondary side can be suppressed.

In an embodiment, the magnetic layers in the secondary side are a first magnetic layer located on one side of the secondary coil, and a second magnetic layer located on this first magnetic layer. The other side of the secondary coil faces the primary coil, and the permeability of the first magnetic layer is higher than that of the second magnetic layer. The magnetic layers in the primary side may be also formed in the same way as those in the secondary side. The embodiment is suitable for the transmission efficiency enhancement and noise reduction.

In an embodiment, the area of the second magnetic layer in the secondary side is larger than that of the first magnetic layer in the secondary side. In the structure, noise can be further reduced.

In an embodiment, the second magnetic layer is located in the vicinity of a functional device in the secondary side. In the structure, the noise to the functional device can be reduced.

In the second aspect, preferably, the contactless power transmission apparatus further comprises a coil for data transmission, and a magnetic layer located in the vicinity of the coil for data transmission. In the structure, the reliability of information communication can be enhanced.

BRIEF DESCRIPTION OF THE DRAWINGS

Preferred embodiments of the invention will now be described in further details. Other features and advantages of the present invention will become better understood with regard to the following detailed description and accompanying drawings where:

FIGS. 4A-4C are schematic diagrams of different secondary coils for the secondary device;

FIG. 5 illustrates characteristic curves of coupling coefficients decided by relative permeability and thickness of a magnetic layer in the secondary device;

FIGS. 6A-6E are sectional views of different magnetic layers for the secondary device;

FIGS. 17A and 17B illustrate the essential parts of contactless power transmission apparatus in accordance with a sixth embodiment of the present invention;

FIG. 18 is a circuit diagram of the apparatus;

BEST MODE FOR CARRYING OUT THE INVENTION

First Embodiment

Figure 1A:
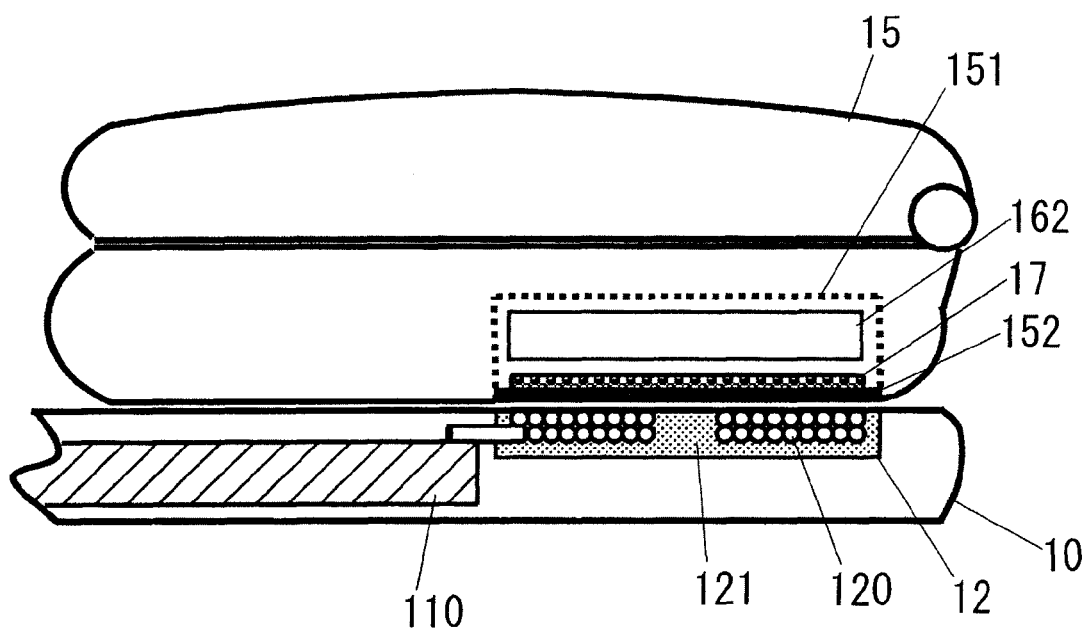
FIG. 1A is a schematic diagram of contactless power transmission apparatus in accordance with a first embodiment of the present invention.
Figure 1B:
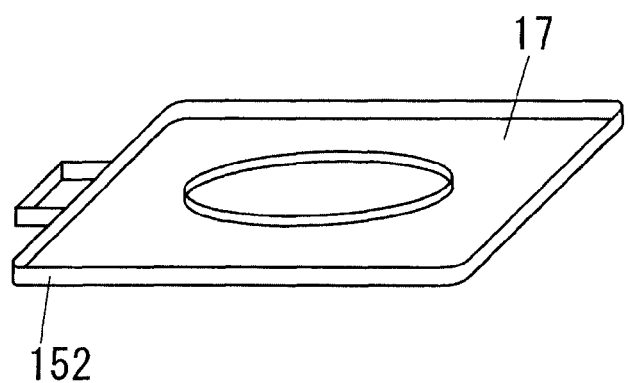
FIG. 1B is a perspective view of a battery cover of a secondary device in the apparatus.
Figure 2:
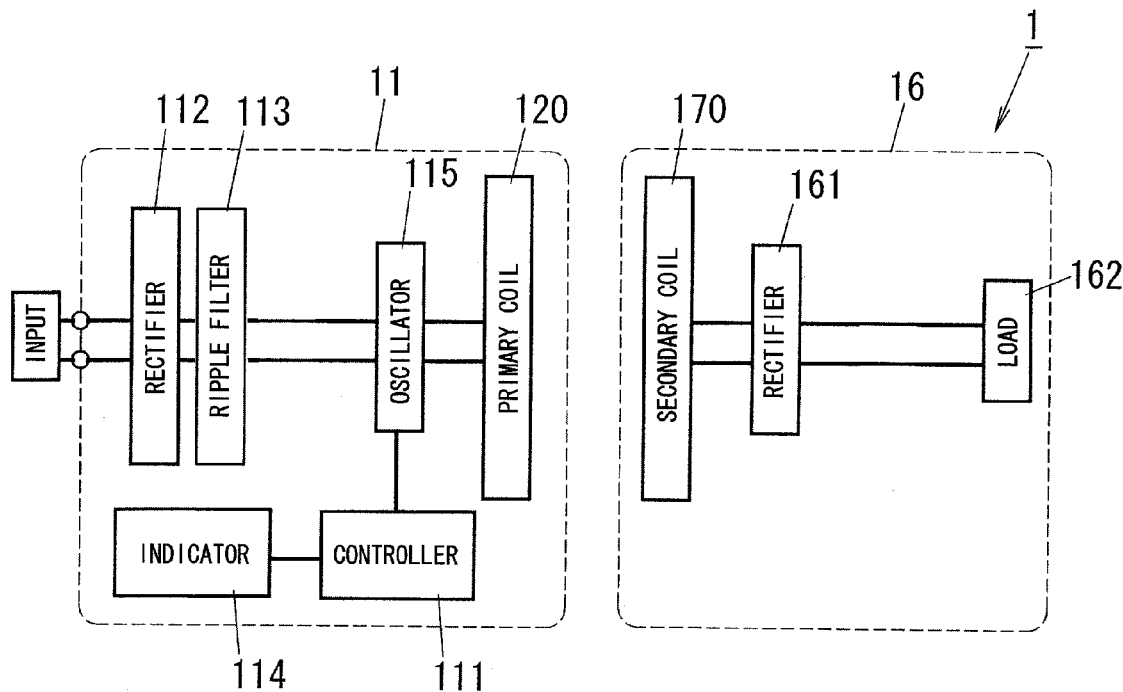
FIG. 2 is a block diagram of the contactless power transmission apparatus.

FIGS. 1A, 1B and 2 show contactless power transmission apparatus 1 in accordance with a first embodiment of the present invention. The apparatus 1 is broadly divided into a power transmitter 11 in a primary side and a power receiver 16 in a secondary side. The transmitter 11 and the receiver 16 include primary and secondary coils 120 and 170 capable of electromagnetic coupling, respectively, and are configured to transmit electric power from the primary side to the secondary side by electromagnetic induction between the primary and secondary coils 120 and 170. Accordingly, the transmitter 11 and the receiver 16 can be separated from each other. The transmitter 11 and the receiver 16 are, but not limited to, a charger 10 (a primary device) and a cell phone 15 (secondary device), respectively.

As shown in FIG. 2, the power transmitter 11 further includes a controller 111, a rectifier 112, a ripple filter 113, an indicator 114 and an oscillator 115, while the power receiver 16 further includes a rectifier 161 and a load 162. However, not limited to this, the power transmitter 11 may be formed of at least a primary coil, a controller and an oscillator when a direct current source is employed in the place of an alternating current source.

Specifically, in the power transmitter 11, the controller 111 is configured to control the indicator 114 and the oscillator 115 when it is activated to transmit electric power to the power receiver 16. The rectifier 112 is, for example, a full wave rectifier and is configured to convert AC (alternating current) voltage from an input (i.e., an alternating current source) into pulsating DC (direct current) voltage to supply the pulsating DC voltage to the ripple filter 113. The ripple filter 113 is configured to smooth the pulsating DC voltage to produce smoothed DC voltage and then to apply the smoothed DC voltage across the primary coil 120 via the oscillator 115. For example, the filter 113 can be formed of an inductor and a capacitor (not shown) in the same way as the charger of the apparatus described in Japanese Patent Application Publication Number 2003-244855 (hereinafter referred to as "conventional apparatus"). That is, the capacitor is connected in series with the inductor, while the combination of the capacitor and the inductor is connected between the output terminals of the rectifier 112. The indicator 114 includes, for example, at least one LED (a light emitting diode), and is configured to drive the LED in accordance with control of the controller 111 in order to show charging condition of the power receiver 16. The oscillator 115 is configured to periodically apply the smoothed DC voltage across the primary coil 120 in accordance with control of the controller 111. For example, the oscillator 115 can be formed of at least one switching device and a diver (not shown) in the same way as the charger of the conventional apparatus. The switching device is connected in series with the primary coil 120, while the combination of the primary coil 120 and the switching device is connected in parallel with the capacitor of the ripple filter 113. Specifically, a first end of the primary coil 120 is connected to the positive terminal of the capacitor of the filter 113, and a second terminal of the primary coil 120 is connected to the negative terminal of the capacitor via the switching device. The diver is configured to periodically turn the switching device on and off in accordance with control of the controller 111. In an example, preferably a snubber circuit formed of a capacitor and a resistor is connected in parallel with the primary coil 120. In an example, the power transmitter 11 may further include a voltage converter that converts the smoothed DC voltage into predetermined DC voltage to apply the converted DC voltage across the primary coil 120 via the oscillator 115.

In the power receiver 16, for example, the rectifier 161 includes at least one diode as a half or full wave rectifier, and is configured to convert the electric current obtained from the secondary coil 170 into a DC current to supply the DC current to the load 162. The load 162 is, but not limited to, a secondary battery (a battery pack). In an example, the rectifier 161 is formed of first and second diodes in the same way as the main body of the conventional apparatus. The cathode and anode of the first diode are connected to a first end of the secondary coil 170 and the negative terminal of the secondary battery, respectively. The cathode and anode of the second diode are connected to the positive terminal of the secondary battery and a second end of the secondary coil 170, respectively. Polarities of the first and second ends of the secondary coil 170 correspond to those of the primary coil 120, respectively. In this example, whenever the switching device of the transmitter 11 is turned off, a current is supplied from the secondary coil 170 to the load 162. In another example, the receiver 16 may further include a controller configured to connect the secondary battery to a power supply, a load and so on of a secondary device. The controller can be formed of a switch device connected in parallel with the second diode, and a driver for turning the switch device on and off, like the main body of the conventional apparatus.

The controller 111, rectifier 112, ripple filter 113, indicator 114 and oscillator 115 are mounted on a printed circuit board, which together constitute a printed circuit assembly 110 as shown in FIG. 1A. The primary coil 120 is included in a primary coil block 12 together with a magnetic layer (or magnetic material) 121. On the other hand, the secondary battery (battery pack) is put in a battery compartment 151 inside a housing 150 of the cell phone 15 to be covered with a battery cover 152, while the rectifier 161 is mounted on a printed circuit board (not shown) put in the housing 150. The secondary coil 170 is also included in a secondary coil block 17 fixed on the inner face of the battery cover 152 (a holding member) which is physically separated from the primary side as shown in FIGS. 1A and 1B. The printed circuit board, on which the rectifier 161 is mounted, has two input terminals (not shown) electrically connected to both input terminals of the rectifier 161, respectively, and also has two output terminals (not shown) electrically connected to both output terminals of the rectifier 161, respectively. The input terminals of the printed circuit board are electrically connected with both ends of the secondary coil 170, respectively when the battery cover 152 supporting the secondary coil block 17 is attached to the housing 150. The output terminals of the printed circuit board are electrically connected with both terminals of the secondary battery when the secondary battery is put in the battery compartment 151.

Figure 3:
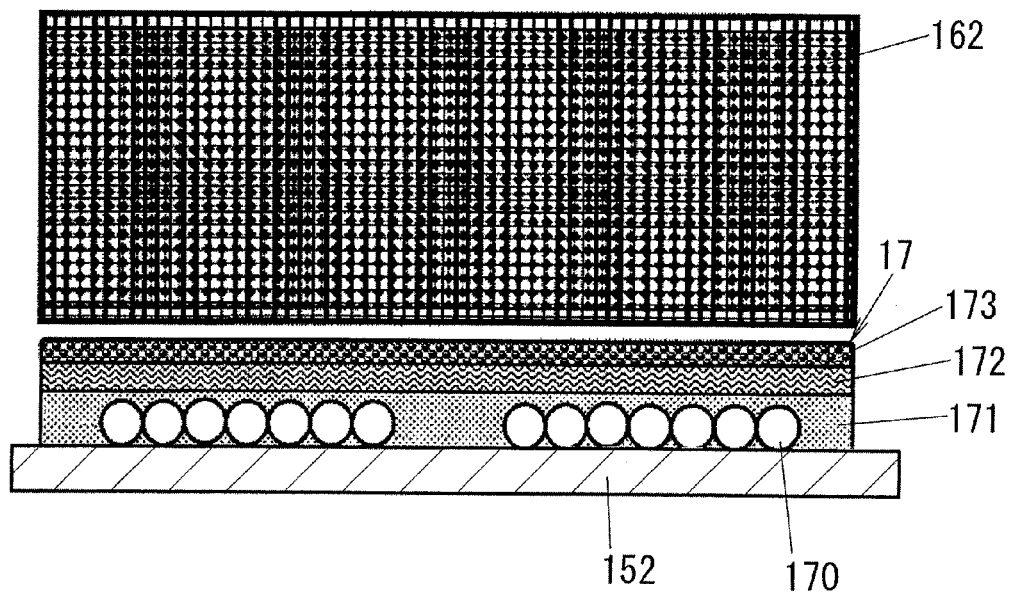
FIG. 3 is a sectional view of the essential parts of the secondary device.

As shown in FIG. 3, the secondary coil block 17 in the secondary side further includes a magnetic layer 171, a shield layer 172 for shielding electromagnetic noise, and a heat insulation layer 173, which together are unified with the secondary coil 170. That is, the secondary coil 170 is a planar coil and the magnetic layer 171 is laminated on at least one side (an upper surface) of the secondary coil 170. The shield layer 172 is also laminated on at least the upper surface of the magnetic layer 171, and the heat insulation layer 173 is laminated on the upper surface of the shield layer 172. Thereby, the secondary coil block 17 is formed, and the other side (an lower surface) of the secondary coil 170 in the block 17 is stuck on the inner face of the battery cover 152 through adhesive. However, not limited to this, in the present invention, at least the magnetic layer may be laminated on one side of the secondary coil and unified with the secondary coil, and also the secondary coil block may be located at other part of the secondary device.

The secondary coil 170 is a single wire, a stranded wire, bundled wires, a self-bonding copper wire, parallel-laid multi-wires or the like. The single wire (hereinafter referred to as a "magnet wire") is a polyurethane enameled copper wire, a polyester enameled copper wire, an enameled copper wire or the like. The stranded wire is composed of a plurality of the magnet wires twisted together. The bundled wires are a bundle of a plurality of the magnet wires. The self-bonding copper wire is the magnet wire, which is further covered with a self-bonding film such as thermoplastic resin, thermosetting resin or the like. The parallel-laid multi-wires are made of a plurality of the magnet wires, and are arranged in parallel and fixed with adhesive. Preferably, the conductor of the magnet wire is in the shape of a square in section. The secondary coil 170 may be a conductive pattern formed on a printed circuit board (not shown), or made though patterning, plating and etching, onto the battery cover 152 or a molding. A pattern of the coil 170 may be in the shape of a circle, a square, an ellipse or the like as shown in FIGS. 4A-4C.

The magnetic layer 171 can be made of a nickel ferrite sheet (magnetic material) having a thickness in the range of 0.1-0.15 mm and 1000 or more of relative permeability, in view of thin style and easy handling as well as a coupling coefficient decided by relative permeability and thickness of the magnetic layer 171. However, not limited to this, the magnetic material of the magnetic layer 171 may be a sheet made from manganese ferrite, amorphous magnetic alloy, Fe—Ni alloy (Permalloy), nanocrystalline magnetic material or the like. Or the magnetic material may be magnetic coating, or a magnetic mixture of resin and magnetic filler or magnetic powder, each of which contains nickel ferrite, manganese ferrite, amorphous magnetic alloy, Fe—Ni alloy, nanocrystalline magnetic material or the like.

In order to form the magnetic layer 171 having a thickness in the range of 0.05-0.1 mm to further thin the secondary coil block 17, it is desirable to use magnetic material having 2000 or more of relative permeability.

FIG. 5 is a graph of coupling coefficients decided by relative permeability and thickness of the magnetic layer 171. In FIGS. 5, "A", "B" and "C" are a thickness of the magnetic layer 171 each, and are 0.15 mm, 0.10 mm and 0.05 mm, respectively. Accordingly, if the relative permeability and thickness of the magnetic layer 171 are set as stated above, it is possible to enhance the power transmission efficiency from the primary side to the secondary side.

As shown in FIG. 6A, the magnetic layer 171 can be laminated at a center cavity 171*a* and the circumference 171*b* of the secondary coil 170, as well as a surface layer 171*c* over the cavity 171*a* and circumference 171*b*. However, not limited to this, the magnetic layer 171 may be laminated as shown in FIGS. 6B-6E. In FIG. 6B, the magnetic layer 171 is laminated at the circumference 171*b* and the surface layer 171*c*. In FIG. 6C, the magnetic layer 171 is laminated at the center cavity 171*a*, as well as a surface layer 171*d* over the cavity 171*a* and the surface of the secondary coil 170. In FIG. 6D, the magnetic layer 171 is laminated at the surface layer 171*c*. In FIG. 6E, the magnetic layer 171 is laminated at the center cavity 171*a*, and also laminated over the entire surface 171*e* of the secondary coil 170, and thereby can enhance the efficiency of magnetic flux passes in the center of the coil 170.

Figure 7A:
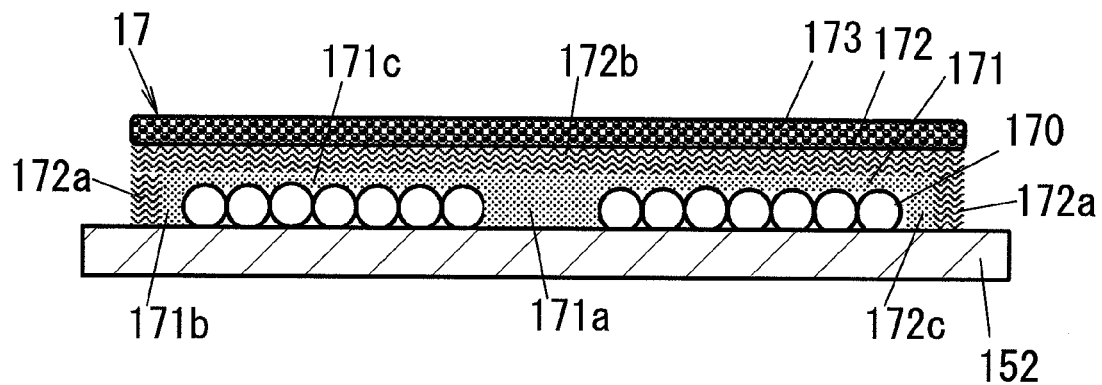
FIGS. 7A-7C are sectional views of different shield layers for the secondary device.
Figure 7B:
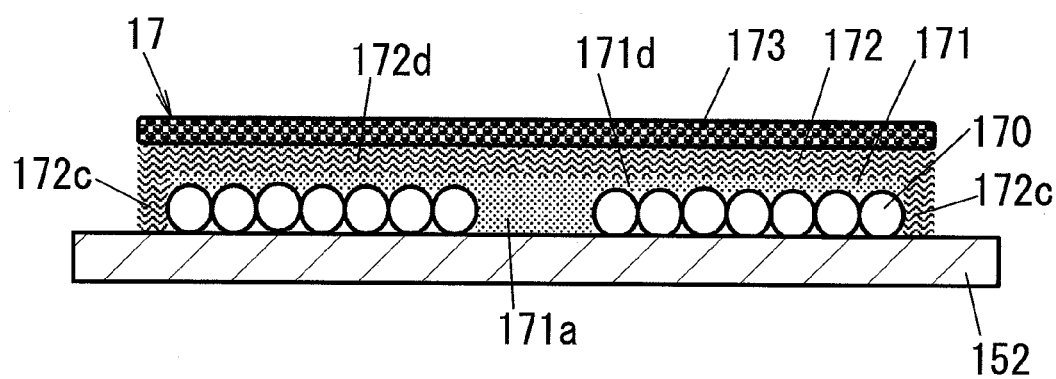
Figure 7C:
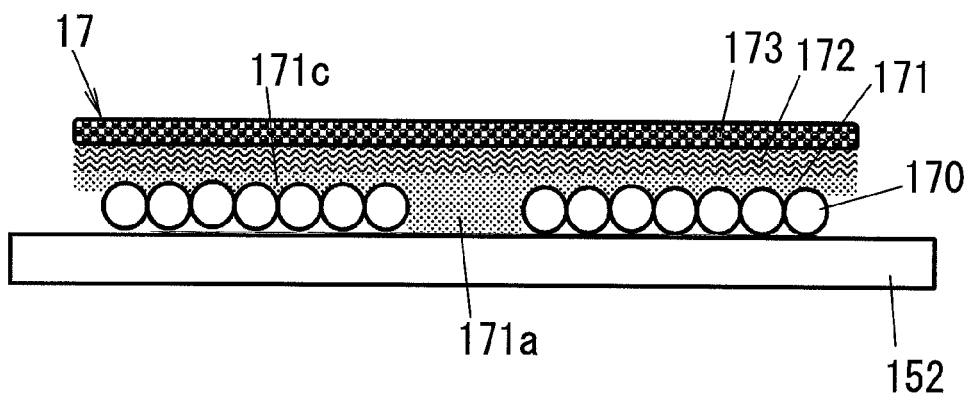

The shield layer 172 is, for example, copper foil or aluminum foil. As shown in FIG. 7A, when the magnetic layer 171 is laminated at the center cavity 171*a*, circumference 171*b* and surface layer 171*c*, the shield layer 172 can be laminated at the circumference 172*a* of the magnetic layer 171, as well as a surface layer 172*b* over the magnetic layer 171 and the circumference 172*a*. However, not limited to this, the shield layer 172 may be laminated as shown in FIGS. 7B and 7C. In FIG. 7B, the magnetic layer 171 is laminated at the center cavity 171*a* and surface layer 171*d*, while the shield layer 172 is laminated at the circumference 172*c* of the secondary coil 170 and magnetic layer 171, as well as a surface layer 172*d* over the magnetic layer 171 and circumference 172*c*. In FIG. 7C, the magnetic layer 171 is laminated at the center cavity 171*a* and surface layer 171*c*, while the shield layer 172 is laminated over the entire surface of the magnetic layer 171.

The heat insulation layer 173 can be formed of heat insulation material obtained by mixing resin with vacuum beads. However, not limited to this, the heat insulation layer 173 may be aerogel, glass cloth, vacuum cells or the like. The heat insulation layer 173 is used to protect components of the secondary device from the heat of the secondary coil 170, and prevents degradation of the battery pack in the first embodiment.

Different methods of manufacturing the secondary coil block 17 are explained. In a manufacturing method, the heat insulation material obtained by mixing resin with vacuum beads is applied on one side (an upper surface) of the shield layer 172 (e.g., copper foil) formed into one shape of FIGS. 7A-7C. Thereby, the heat insulation layer 173 is formed on the one side of the shield layer 172, which are then fixed together by drying. Subsequently, the other side (a lower surface) of the shield layer 172 is stuck to one side (an upper surface) of the magnetic layer 171 (e.g., the nickel ferrite sheet) formed into one shape of FIGS. 6A-6E with adhesive or pressure sensitive adhesive. The secondary coil 170 is then stuck on the other side (a lower surface) of the magnetic layer 171 with adhesive or pressure sensitive adhesive which is mixed with magnetic filler or magnetic powder, so that the secondary coil block 17 is obtained. However, not limited to this, the magnetic layer 171 may be formed of the above-mentioned magnetic material, and adhesive or pressure sensitive adhesive, which is mixed with magnetic filler or magnetic powder. In this example, since a sheet shaped magnetic material can be used, the secondary coil block 17 can be manufactured by a simpler manufacturing method.

Figure 8:
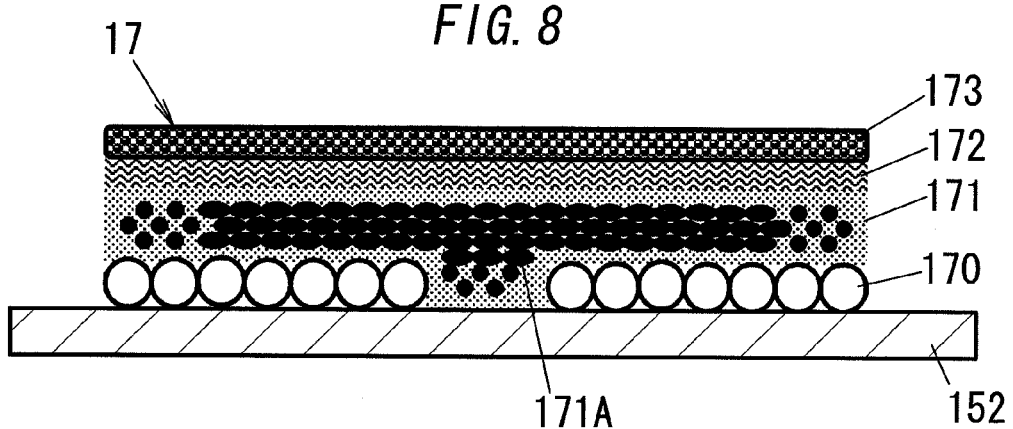
FIG. 8 is a sectional view of the essential parts of a secondary device in another example.

In a manufacturing method, the heat insulation material obtained by mixing resin with vacuum beads is applied on one side (an upper surface) of the shield layer 172 (e.g., copper foil) formed into one shape of FIGS. 7A-7C. Thereby, the heat insulation layer 173 is formed on the one side of the shield layer 172, which are then fixed together by drying. Subsequently, Fe- or Ni-flat powder or particle powder is filled between the other side (lower surface) of the shield layer 172 and the secondary coil 170, and the shield layer 172 and secondary coil 170 are stuck together with adhesive or pressure sensitive adhesive, which is mixed with magnetic filler or magnetic powder. As a result, the magnetic layer 171 is formed of the flat powder or particle powder, and the adhesive or pressure sensitive adhesive, while at the same time the secondary coil block 17 is obtained. The flat powder or particle powder, and the adhesive or pressure sensitive adhesive are denoted by 171A of FIG. 8 when the magnetic layer 171 is formed into, for example, the shape of FIG. 6C.

In a manufacturing method, the heat insulation material obtained by mixing resin with vacuum beads is applied on one side (an upper surface) of the shield layer 172 (e.g., copper foil) formed into one shape of FIGS. 7A-7C. Thereby, the heat insulation layer 173 is formed on the one side of the shield layer 172, which are then fixed together by drying. Subsequently, the magnetic material (e.g., magnetic paint, or magnetic mixture of resin and magnetic filler or magnetic powder) is applied on the other side (a lower surface) of the shield layer 172, which are then dried. Subsequently, the secondary coil 170 is stuck on the lower surface of the magnetic material with adhesive or pressure sensitive adhesive, which is mixed with magnetic filler or magnetic powder. Consequently, the secondary coil block 17 is obtained. The magnetic layer 171 is also formed of the magnetic material, and the adhesive or pressure sensitive adhesive.

In a manufacturing method, the heat insulation material obtained by mixing resin with vacuum beads is applied on one side (an upper surface) of the shield layer 172 (e.g., copper foil) formed into one shape of FIGS. 7A-7C. Thereby, the heat insulation layer 173 is formed on the one side of the shield layer 172, which are then fixed together by drying. Subsequently, the secondary coil 170 covered with magnetic plating is stuck on the other side (a lower surface) of the shield layer 172 with adhesive or pressure sensitive adhesive, which is mixed with magnetic filler or magnetic powder. Consequently, the secondary coil block 17 is obtained. The magnetic layer 171 is also formed of the magnetic plating, and the adhesive or pressure sensitive adhesive.

In each of the manufacturing methods, preferably sticking several thin layers together as stated above is treated collectively by pressing. In an example, the secondary coil block 17 and the battery cover 152 are integrally molded.

In an example, the secondary coil 170 is stuck and then the secondary coil block 17 is obtained, while at the same time the secondary coil block 17 is stuck on the inner face of the battery cover 152. For example, the secondary coil 170 is fixed on the inner face of the battery cover 152 by insert molding.

Second Embodiment

Figure 9:
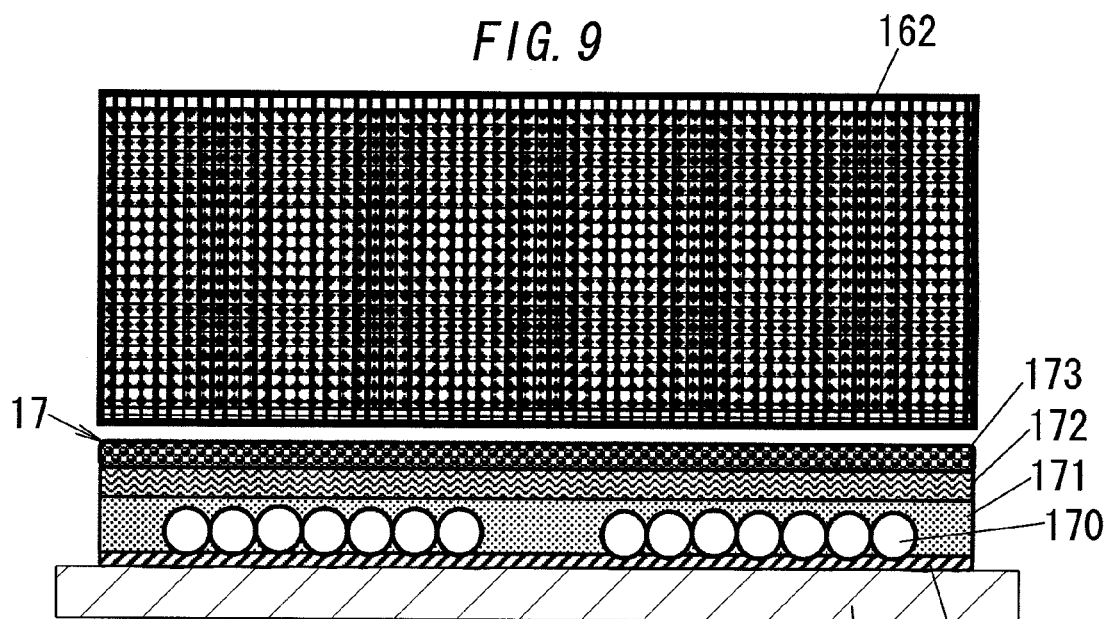
FIG. 9 is a sectional view of the essential parts of a power receiver in contactless power transmission apparatus in accordance with a second embodiment of the present invention.

FIG. 9 shows a power receiver in contactless power transmission apparatus in accordance with a second embodiment of the present invention. For the purpose of clarity, like kind elements are assigned the same reference numerals as depicted in the first embodiment.

The power receiver in the second embodiment further includes a radiation layer 174 intervened between the battery cover 152 and the secondary coil 170 in order to improve radiation characteristics from the battery cover 152. The radiation layer 174 can be made of the material that has high thermal conductivity and does not disturb magnetic flux coupling between the primary and secondary coils 120 and 170 (e.g., sheet shaped silicon)

Third Embodiment

Figure 10:
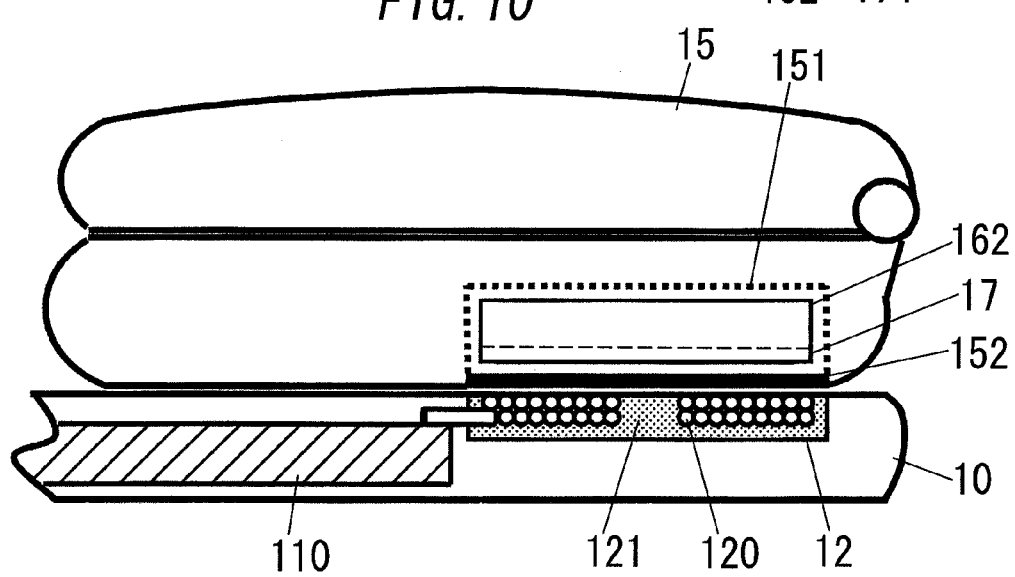
FIG. 10 is a schematic diagram of contactless power transmission apparatus in accordance with a third embodiment of the present invention.

FIG. 10 shows contactless power transmission apparatus in accordance with a third embodiment of the present invention. For the purpose of clarity, like kind elements are assigned the same reference numerals as depicted in the first embodiment.

Figure 11:
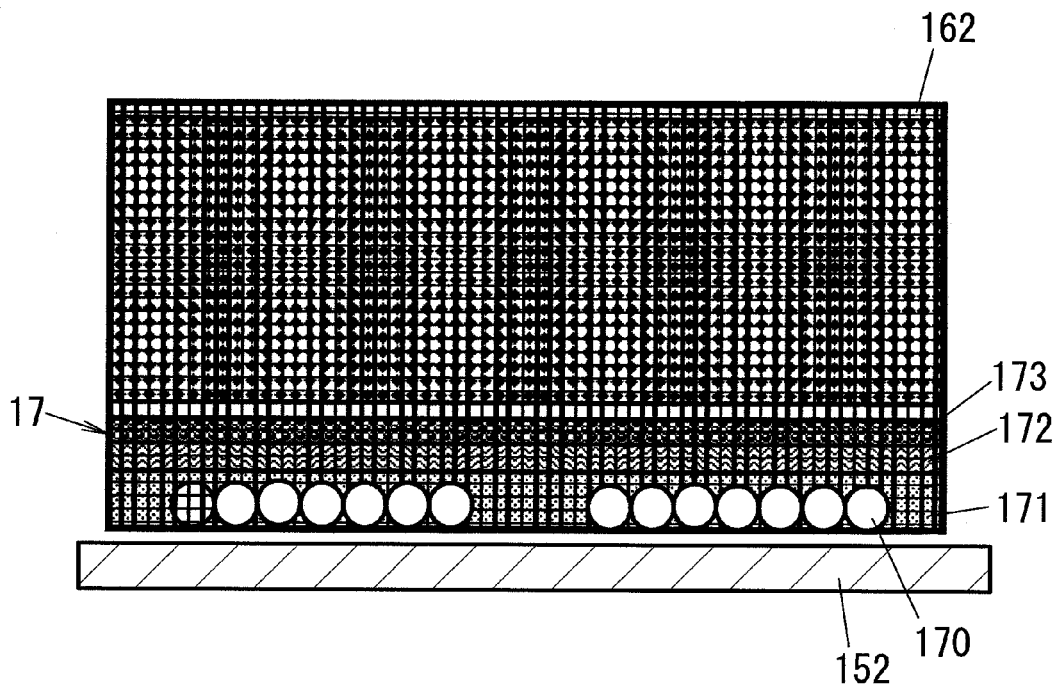
FIG. 11 is a sectional view of the essential parts of a power receiver in the apparatus.

In the third embodiment, a secondary coil block 17 and a functional member (a holding member) of a cell phone 15 are united. For example, as shown in FIGS. 10 and 11, the functional member is a load 162 (a secondary battery (a battery pack)), and the top of the secondary coil block 17, namely the upper surface of a heat insulation layer 173 is stuck on the bottom of the secondary battery with adhesive or pressure sensitive adhesive. However, not limited to this, the secondary coil block 17 and the secondary battery may be laminated with a wrapping film, or formed in a lump.

Fourth Embodiment

Figure 12:
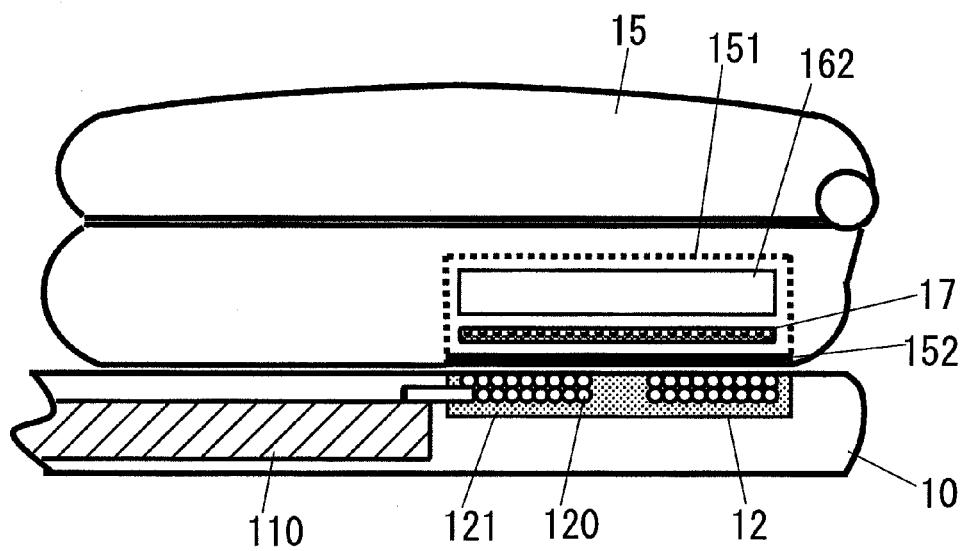
FIG. 12 is a schematic diagram of contactless power transmission apparatus in accordance with a fourth embodiment of the present invention.

FIG. 12 shows contactless power transmission apparatus in accordance with a fourth embodiment of the present invention. For the purpose of clarity, like kind elements are assigned the same reference numerals as depicted in the first embodiment.

Figure 13:
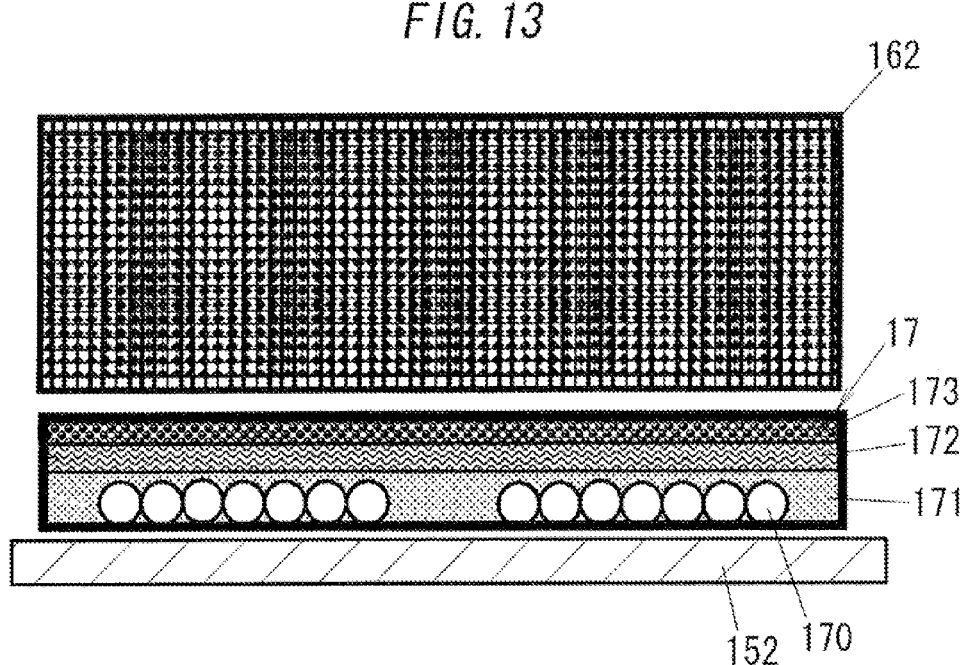
FIG. 13 is a sectional view of the essential parts of a power receiver in the apparatus.

A shown in FIGS. 12 and 13, a secondary coil block 17 in the fourth embodiment is in the form of a card, and can be attached to and detached from a cell phone 15 (a holding member). The secondary coil block 17 may be formed as a single card, or put in a card shaped package. The secondary coil block 17 is put in a battery compartment 151 inside a housing 150 of the cell phone 15 together with a load 162 (a secondary battery (a battery pack)). In an example of the holding member, first and second ends of a secondary coil 170 of the secondary coil block 17 are located at one end of the block 17, which can be attached to and detached from a card connector (not shown) in the cell phone 15. The card connector (a holding member) is mounted on a printed circuit board which a rectifier 161 is mounted on and put in a housing 150 of the cell phone 15.

Fifth Embodiment

Figure 14A:
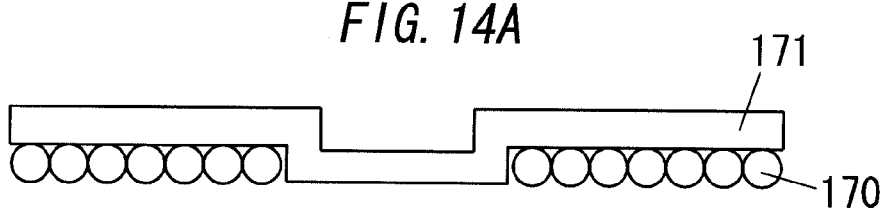
FIGS. 14A and 14B illustrate the essential parts of a power receiver in contactless power transmission apparatus in accordance with a fifth embodiment of the present invention.
Figure 14B:
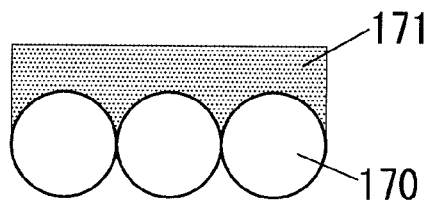

FIGS. 14A and 14B show essential parts of a power receiver in contactless power transmission apparatus in accordance with a fifth embodiment of the present invention. For the purpose of clarity, like kind elements are assigned the same reference numerals as depicted in the first embodiment.

As shown in FIGS. 14A and 14B, a magnetic layer 171 in the fifth embodiment is formed to spread over a spiral depression on one side (an upper surface) of a secondary coil 170. For example, the magnetic layer 171 can be easily formed by pressing magnetic material (e.g., soft magnetic material made of crystalline metal material or non-crystalline metal material) on one side of the secondary coil 170. If magnetic material having different particle sizes, flat shaped magnetic material, or a mixture of them is used, the filling factor into the spiral depression can be enhanced. If magnetic material with proper viscosity is used, leakage of the magnetic material from a spiral gap of the secondary coil 170 can be prevented. In this structure, magnetic flux density can be increased, and the thickness of the secondary coil 170 and the magnetic layer 171 can be reduced.

Figure 15A:
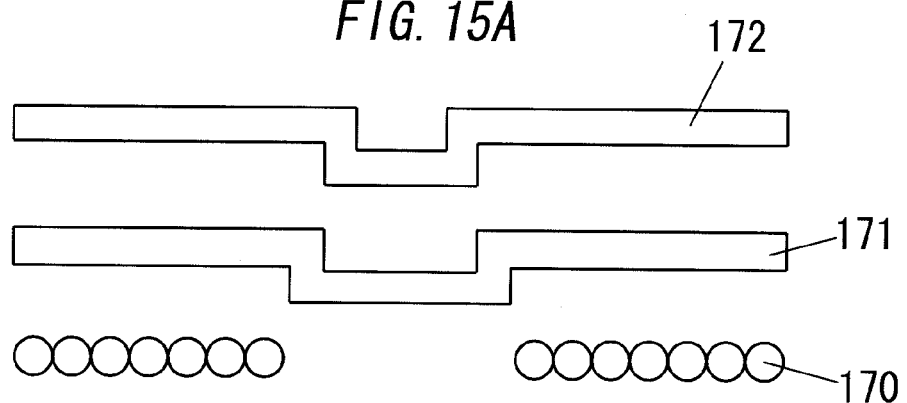
FIGS. 15A and 15B illustrate the essential parts of a power receiver in an example.
Figure 15B:
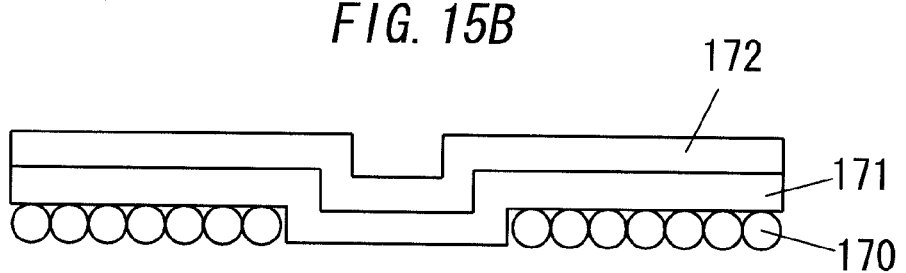

In an example, as shown in FIGS. 15A and 15B, not only the magnetic layer 171 but also a shield layer 172 (and a heat insulation layer 173) may be pressed at the same time.

Figure 16:
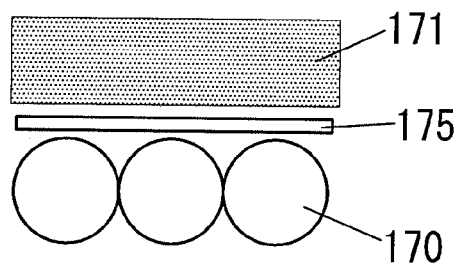
FIG. 16 illustrates the essential parts of a power receiver in an example.

In an example, as shown in FIG. 16, the magnetic layer 171 may be formed by locating an insulating thin film 175 (e.g., a PET film) between the secondary coil 170 and the above-mentioned magnetic material to press the magnetic material on the one side of the secondary coil 170. In this example, it is possible to prevent the magnetic material from leaking from a spiral gap of the secondary coil 170, and the magnetic material can be only spread over the spiral depression on the one side of the secondary coil 170.

In an example, the magnetic layer 171 may be formed by casting or molding to be laminated on the secondary coil 170 by integral processing (pressing), adhesive (e.g., adhesive resin), or the like.

Sixth Embodiment

FIGS. 17A and 17B show the essential parts of contactless power transmission apparatus in accordance with a sixth embodiment of the present invention. For the purpose of clarity, like kind elements are assigned the same reference numerals as depicted in the first-embodiment.

In the above-mentioned first-fifth embodiments, each primary side includes a primary coil, and a magnetic layer laminated on at least one side of the primary coil, while each secondary side includes a secondary coil, a magnetic layer laminated on at least one side of the secondary coil, and a shield layer laminated on the magnetic layer. In each of them, if a shield layer is also laminated on the magnetic layer of a primary side, noise can be converted into heat to be absorbed with two shield layers. In addition, power transmission efficiency between primary and secondary sides can be enhanced with the two magnetic layers. Moreover, if the switching device(s) of an oscillator 115 is driven by a high switching frequency in the range of dozens to several hundred kHz, a secondary device can be miniaturized.

However, the housings of primary and secondary devices exist between primary and secondary coils, and accordingly coupling between the primary and secondary coils is reduced and magnetic flux leakage can be increased, thereby creating difficulty in fully eliminating noise with a shield layer made of copper foil, aluminum foil or the like.

Therefore, in order to further reduce the influence of noise, at least secondary side of the present invention includes a plurality of magnetic layers. In the sixth embodiment, each of the primary and secondary sides includes a plurality of magnetic layers. That is, a power transmitter (a primary device) in the primary side has a housing 100 and a primary coil 120 stuck on the inner face of the housing 120, and the plurality of magnetic layers of the primary side are magnetic layers 121H and 121L that are laminated on one side of the primary coil 120. Specifically, the magnetic layer (first magnetic layer) 121H is laminated on the one side of the primary coil 120, and the magnetic layer (second magnetic layer) 121L is laminated on the magnetic layer 121H.

On the other hands, a power receiver (a secondary device) in the secondary side has a housing 150 and a secondary coil 170 stuck on the inner face of the housing 150, and the plurality of magnetic layers of the secondary side are magnetic layers 171H and 171L that are laminated on one side of the secondary coil 170. Specifically, the magnetic layer (first magnetic layer) 171H is laminated on the one side of the primary coil 170, and the magnetic layer (second magnetic layer) 171L is laminated on the magnetic layer 171H. When electric power is transmitted from the primary side to the secondary side, the primary and secondary coils are arranged opposite each other through the housings 100 and 150.

Permeability of the magnetic layer 121H is higher than that of the magnetic layer 121L, but which does not mean the absolute value. Similarly, permeability of the magnetic layer 171H is higher than that of the magnetic layer 171L. Each magnetic material of the magnetic layers 121H and 171H is for example ferrite, while each magnetic material of the magnetic layers 121L and 171L is e.g., compound of amorphous material and resin. In an example, from viewpoint of after-mentioned switching frequency, the permeability of the magnetic layer 121H is 2000, and the permeability of the magnetic layer 121L is 100, while the permeability of the magnetic layer 171H is 1000, and the permeability of the magnetic layer 171L is 50.

The overall size (diameter) of the secondary coil 170 is shorter than that of the primary coil 120. In an example, the outside diameter, inside diameter and thickness of the primary coil 120 are φ34 mm, φ10 mm and 1 mm, respectively and the outside diameter, inside diameter and thickness of the primary coil 170 are φ25 mm, φ8 mm and 0.2 mm, respectively.

Each size of the magnetic layers 121H and 121L is the same as that of the primary coil 120 (e.g., φ34 mm). On the other hand, the magnetic layer 171H is larger than the secondary coil 170, and the magnetic layer 171L is larger than the magnetic layer 171H. For example, length, width and thickness of the magnetic layer 171H are 30 mm, 30 mm (i.e., □30 mm×30 mm) and 0.2 mm, respectively while length, width and thickness of the magnetic layer 171L are 34 mm, 34 mm (i.e., □34 mm×34 mm) and 0.1 mm, respectively.

FIG. 18 is a circuit diagram of the contactless power transmission apparatus in the sixth embodiment. The power transmitter 11 in the primary side includes the primary coil 120, a controller 111, a DC power source 223 and an oscillator 115. This oscillator 115 has a switching device (FET) 116 and a driver 117. The primary coil 120 is connected in series with the switching device 116, while the combination of the primary coil 120 and the switching device 116 is connected between both output terminals of the DC power source 223. Specifically, a first end T11 of the primary coil 120 is connected to the positive output terminal of the DC power source 223, and a second end T12 of the primary coil 120 is connected to the negative output terminal of the DC power source 223 via the switching device 116. The controller 111 is configured to control the oscillator 115 when it is activated to transmit electric power to the power receiver 16. For example, the controller 111 turns the switching device 116 on and off at the switching frequency of 100 kHz through the driver 117. In FIG. 18, a capacitor 118 is connected in parallel with the primary coil 120. In an example, a rectifier and a ripple filter may be used in the place of the DC power source 223.

The power receiver 16 in the secondary side includes the secondary coil 170, a rectifier 161 and a load 162 (e.g., secondary battery). Polarities of first and second ends T21 and T22 of the secondary coil 170 correspond to those of the primary coil 120, respectively. The first end T21 is connected with the negative terminal of the secondary battery. The rectifier 161 is a diode of which cathode and anode are connected to the positive terminal of the secondary battery and the second end T22 of the secondary coil 170, respectively. In FIG. 18, a capacitor 163 is connected in parallel with the secondary battery.

The switching device 116 is turned on and off by the switching frequency, and then magnetic flux is generated at the primary coil 120 to interlink with the secondary coil 170. Accordingly, an electric current is supplied from the secondary coil 170 and then rectified and smoothed at the rectifier 161 and the capacitor 163 to be supplied to the secondary battery. Thereby, the secondary battery is charged.

Figure 19:
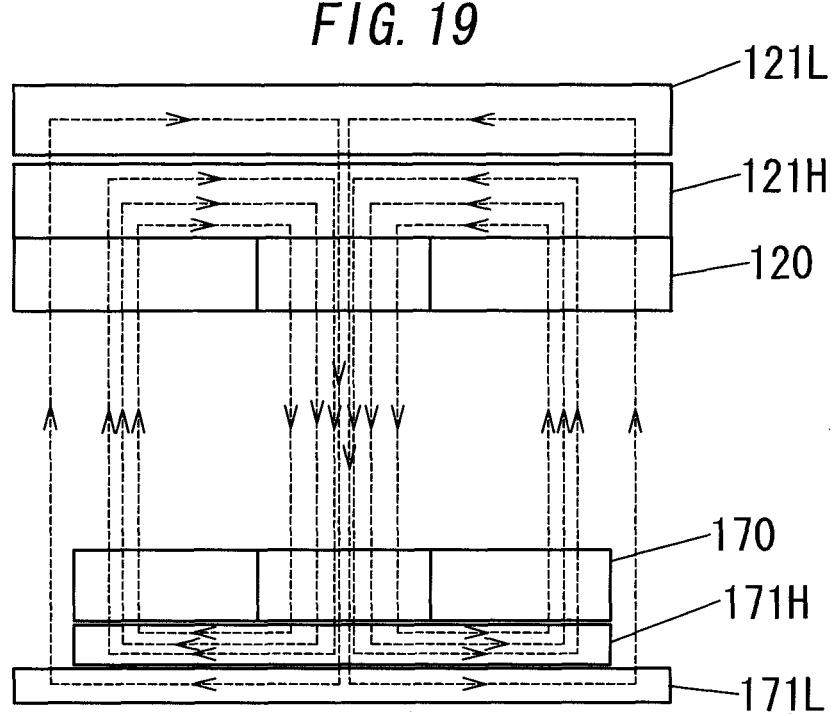
FIG. 19 illustrates magnetic flux in the apparatus.

FIG. 19 illustrates magnetic flux in the contactless power transmission apparatus. The magnetic layers 121H and 171H enhance coupling of the primary and secondary coils 120 and 170, and accordingly the power transmission efficiency between the primary and secondary sides is enhanced.

Noise is further reduced with the magnetic layers 121L and 171L, especially the magnetic layer 171L. That is, the magnetic path between the magnetic layer 171L and the magnetic layers 121H and 121L encloses the magnetic path between the primary and secondary coils 120 and 170, because the magnetic layer 171L exists behind the secondary coil 170 and the magnetic layer 171H and is larger than them. Accordingly, it is possible to enhance transmission efficiency of frequency components (harmonic components and signal components) from the primary side to the secondary side, which are higher than the switching frequency (i.e., 100 kHz). As a result, noise can be further suppressed, and leakage of the frequency components can be reduced.

Figure 20:
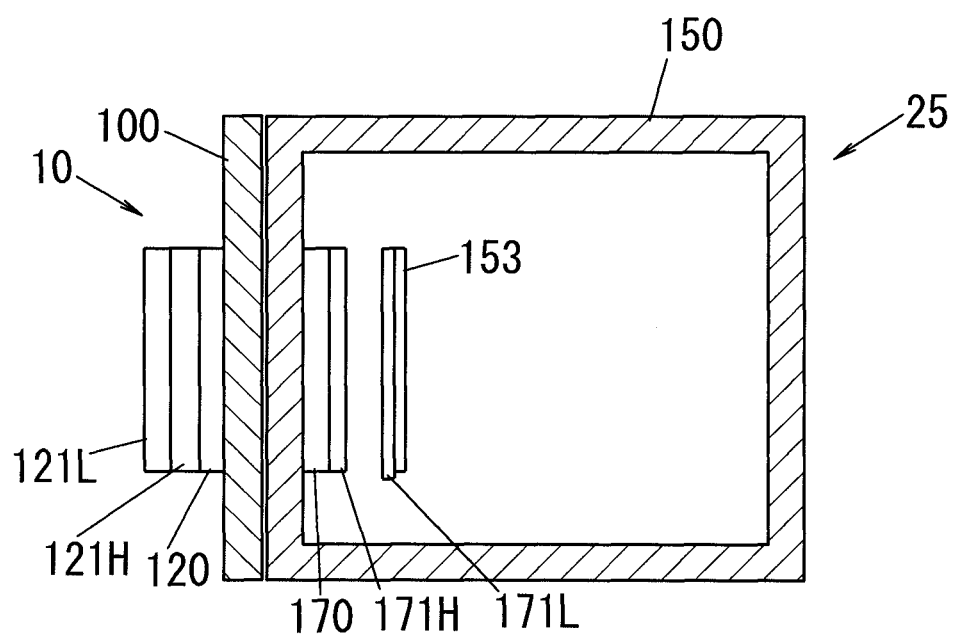
FIG. 20 illustrates the essential parts of contactless power transmission apparatus in an embodiment.

In an embodiment, as shown in FIG. 20, the primary and secondary devices are a charger 10 and a cell phone 15, respectively. The magnetic layer 171H is located on the secondary coil 170, while the magnetic layer 171L is located in the vicinity of an antenna 153 (a functional device) in the housing 150. Specifically, the magnetic layer 171L is located in the vicinity of the antenna 153 between the secondary coil 170 and the antenna 153. Accordingly, it is possible to prevent noise from entering the antenna 153 from the secondary coil side.

Figure 21:
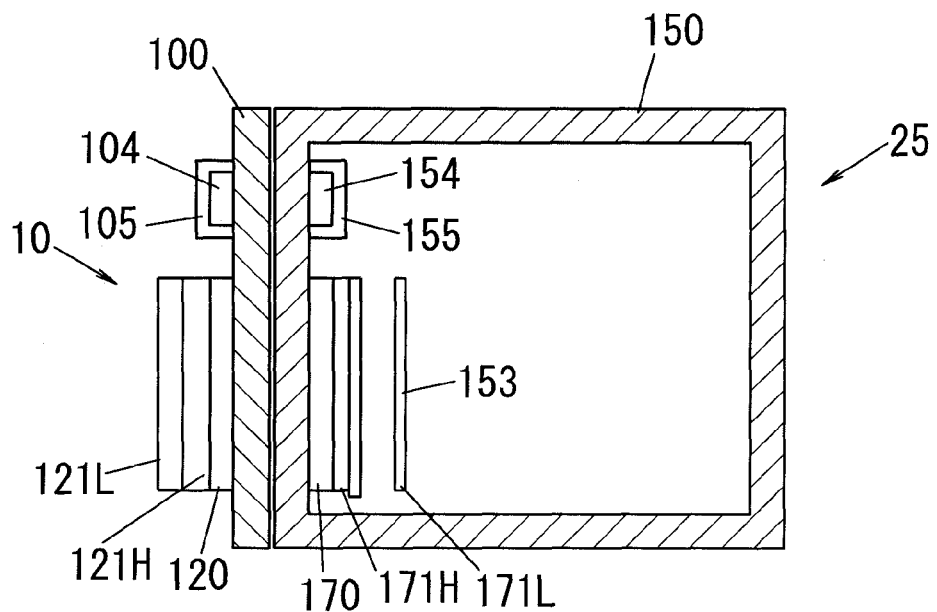
FIG. 21 illustrates the essential parts of contactless power transmission apparatus in an embodiment.

In an embodiment, as shown in FIG. 21, the primary and secondary devices are a charger 10 and a cell phone 15, respectively. The charger 10 further includes a coil for data transmission 104 and a magnetic layer 105, while the cell phone 15 further includes a coil for data transmission 154 and a magnetic layer 155. The coils 104 and 154 are used to send and receive a signal (information) representing charging start, charging completion or the like. The coil 104 is located on the inner face of the housing 100, and the magnetic layer 105 is located on the coil 104. Similarly, the coil 154 is located on the inner face of the housing 150, and the magnetic layer 155 is located on the coil 154. In this embodiment, reliability of signal transmission between the coils 104 and 154 can be improved.

Figure 22A:
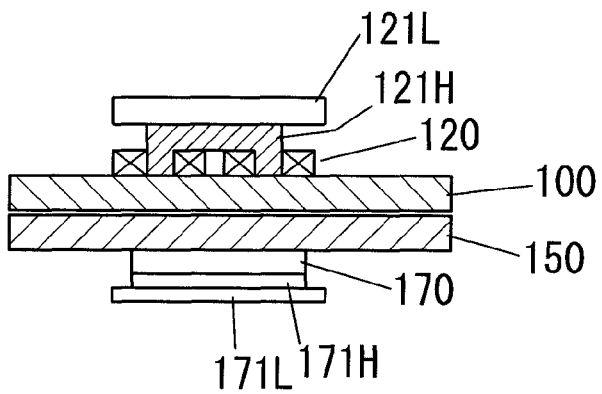
FIGS. 22A and 22B illustrate the essential parts of contactless power transmission apparatus in an embodiment.
Figure 22B:
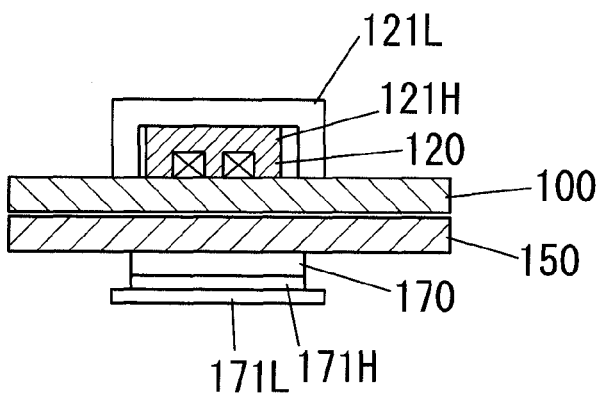

In an embodiment, if thinning of the primary side is not required, an EE core or a UU core, and a coil wound around either of them may be utilized in the place of the above-mentioned primary coil and a magnetic layer(s) in the primary side, as shown in FIGS. 22A and 22B.

Although the present invention has been described with reference to certain preferred embodiments, numerous modifications and variations can be made by those skilled in the art without departing from the true spirit and scope of this invention.

The invention claimed is:

1. Contactless power transmission apparatus, comprising a secondary coil located in a secondary side, said apparatus being configured to transmit electric power from a primary side to the secondary side by electromagnetic induction between a primary coil and the secondary coil, said primary coil being located in the primary side;
wherein the secondary side further comprises: a holding member which is physically separated from the primary side; a magnetic layer; a shield layer for shielding electromagnetic noise; and a heat insulation layer;
wherein the secondary coil is a planar coil and supported by the holding member directly or through a radiation layer, and the magnetic layer is laminated directly on a center cavity and the circumference of the planar coil as well as a surface over the cavity and circumference, and unified with the planar coil.

2. The contactless power transmission apparatus of claim 1, further comprising a radiation layer located between the holding member and the planar coil.

3. The contactless power transmission apparatus of claim 1 or 2, wherein the magnetic layer is formed to spread over a spiral depression on said one side of the planar coil.

4. The contactless power transmission apparatus of claim 1 or 2, wherein: the magnetic layer is laminated on said one side of the planar coil; the shield layer is laminated on the magnetic layer; and the heat insulation layer is laminated on the shield layer.

5. The contactless power transmission apparatus of claim 3, wherein: the magnetic layer is laminated on said one side of the planar coil; the shield layer is laminated on the magnetic layer; and the heat insulation layer is laminated on the shield layer.

6. The contactless power transmission apparatus of claim 1 or 2, further comprising a secondary device which includes the secondary side and has a housing, wherein the holding member is a part of the housing.

7. The contactless power transmission apparatus of claim 3, further comprising a secondary device which includes the secondary side and has a housing, wherein the holding member is a part of the housing.

8. The contactless power transmission apparatus of claim 4, further comprising a secondary device which includes the secondary side and has a housing, wherein the holding member is a part of the housing.

9. The contactless power transmission apparatus of claim 1 or 2, further comprising a functional member located in the secondary side, wherein the holding member is the functional member.

10. The contactless power transmission apparatus of claim 3, further comprising a functional member located in the secondary side, wherein the holding member is the functional member.

11. The contactless power transmission apparatus of claim 4, further comprising a functional member located in the secondary side, wherein the holding member is the functional member.

12. The contactless power transmission apparatus of claim 1 or 2, further comprising a secondary device including the secondary side and the holding member,
wherein the combination of the planar coil and at least the magnetic layer is in the form of a card, and can be attached to and detached from the holding member.

13. The contactless power transmission apparatus of claim 3, further comprising a secondary device including the secondary side and the holding member,
wherein the combination of the planar coil and at least the magnetic layer is in the form of a card, and can be attached to and detached from the holding member.

14. The contactless power transmission apparatus of claim 4, further comprising a secondary device including the secondary side and the holding member,
wherein the combination of the planar coil, the magnetic layer, the shield layer and the heat insulation layer is in the form of a card, and can be attached to and detached from the holding member.

15. The contactless power transmission apparatus of claim 5, further comprising a secondary device including the secondary side and the holding member,
wherein the combination of the planar coil, the magnetic layer, the shield layer and the heat insulation layer is in the form of a card, and can be attached to and detached from the holding member.

16. A method of manufacturing the second side in the contactless power transmission apparatus of claim 1, comprising forming the magnetic layer by pressing magnetic material made of crystalline metal material or non-crystalline metal material.

17. A method of manufacturing the second side in the contactless power transmission apparatus of claim 4, comprising:
applying the heat insulation layer to one side of the shield layer;
fixing the heat insulation layer and the shield layer by drying;
sticking the other side of the shield layer and one side of the magnetic layer together; and
sticking the other side of the magnetic layer and said one side of the planar coil together.

18. The contactless power transmission apparatus of claim 5, further comprising a secondary device which includes the secondary side and has a housing, wherein the holding member is a part of the housing.

19. The contactless power transmission apparatus of claim 5, further comprising a functional member located in the secondary side, wherein the holding member is the functional member.

20. The contactless power transmission apparatus of claim 1, wherein the secondary coil is a single wire as a magnet wire, said single wire being a polyurethane enameled copper wire, a polyester enameled copper wire or an enameled copper wire.

* * * * *